US008116000B2

(12) United States Patent
Plant (10) Patent No.: US 8,116,000 B2
(45) Date of Patent: Feb. 14, 2012

(54) TANDEM POLARIZATION BEAM SPLITTERS FOR REAL-TIME POLARIZATION DIFFERENCE SENSING

(75) Inventor: James Plant, Victoria (CA)

(73) Assignee: Q5 Innovations Inc., Victoria, British Columbia (CA)

( * ) Notice: Subject to any disclaimer, the term of this patent is extended or adjusted under 35 U.S.C. 154(b) by 154 days.

(21) Appl. No.: 11/840,564

(22) Filed: Aug. 17, 2007

(65) Prior Publication Data
US 2008/0043330 A1    Feb. 21, 2008

Related U.S. Application Data

(60) Provisional application No. 60/838,585, filed on Aug. 18, 2006.

(51) Int. Cl.
*G02B 5/30* (2006.01)
(52) U.S. Cl. .......... 359/485.06; 359/485.02; 359/485.01
(58) Field of Classification Search .................... 359/487
See application file for complete search history.

(56) References Cited

U.S. PATENT DOCUMENTS

| | | | | |
|---|---|---|---|---|
| 3,463,575 A * | 8/1969 | Gates, Jr. | ............... | 359/489.11 |
| 4,425,028 A * | 1/1984 | Gagnon et al. | ............... | 359/246 |
| 4,521,082 A * | 6/1985 | Suzuki et al. | ............... | 359/386 |
| 5,973,835 A * | 10/1999 | Tsou et al. | ............... | 359/495 |
| 6,623,121 B2 * | 9/2003 | Sato | ............... | 353/20 |
| 2003/0043376 A1* | 3/2003 | Kishikawa et al. | ............... | 356/432 |
| 2006/0187547 A1* | 8/2006 | Fukuda | ............... | 359/485 |

OTHER PUBLICATIONS

Anchor Optics Catalog. Advertisement for Porro-Abbe Prism. pp. 1, 2 and 50.

* cited by examiner

*Primary Examiner* — Lee Fineman
(74) *Attorney, Agent, or Firm* — Davis & Bujold, P.L.L.C.

(57) ABSTRACT

A tandem beam splitter for real-time polarization difference sensing, with at least one body having two faces that isolate two orthogonal planes of information from a common stimulus input in series, with a first of the two faces isolating a first plane of information and a second of the two faces isolating a second plane of information which is orthogonal to the first plane.

6 Claims, 11 Drawing Sheets

TANDEM POLARIZATION BEAM SPLITTERS FOR REAL-TIME POLARIZATION DIFFERENCE SENSING

FIELD

The present invention relates to tandem polarization beam splitters for real-time polarization differences sensing.

BACKGROUND

Polarization beam splitters offer selective polarization isolation of only the reflected component of the stimulus. The transmitted portion is comprised of all remaining planes of polarization. Typical polarization beam splitters only effectively isolate the plane of polarization which is reflected at the interface within the beam splitter cube. As such, they cannot be used in isolation to effectively isolate orthogonal planes of polarization within a common stimulus input for the purposes of creating a polarization difference image.

SUMMARY

According there is provided a tandem beam splitter for real-time polarization difference sensing, consisting of at least one body having two faces that isolate two orthogonal planes of information from a common stimulus input in series, with a first of the two faces isolating a first plane of information and a second of the two faces isolating a second plane of information which is orthogonal to the first plane.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

The preferred embodiment of tandem polarization beam splitters will now be described with reference to FIG. 1 through 10.

Figure 1:
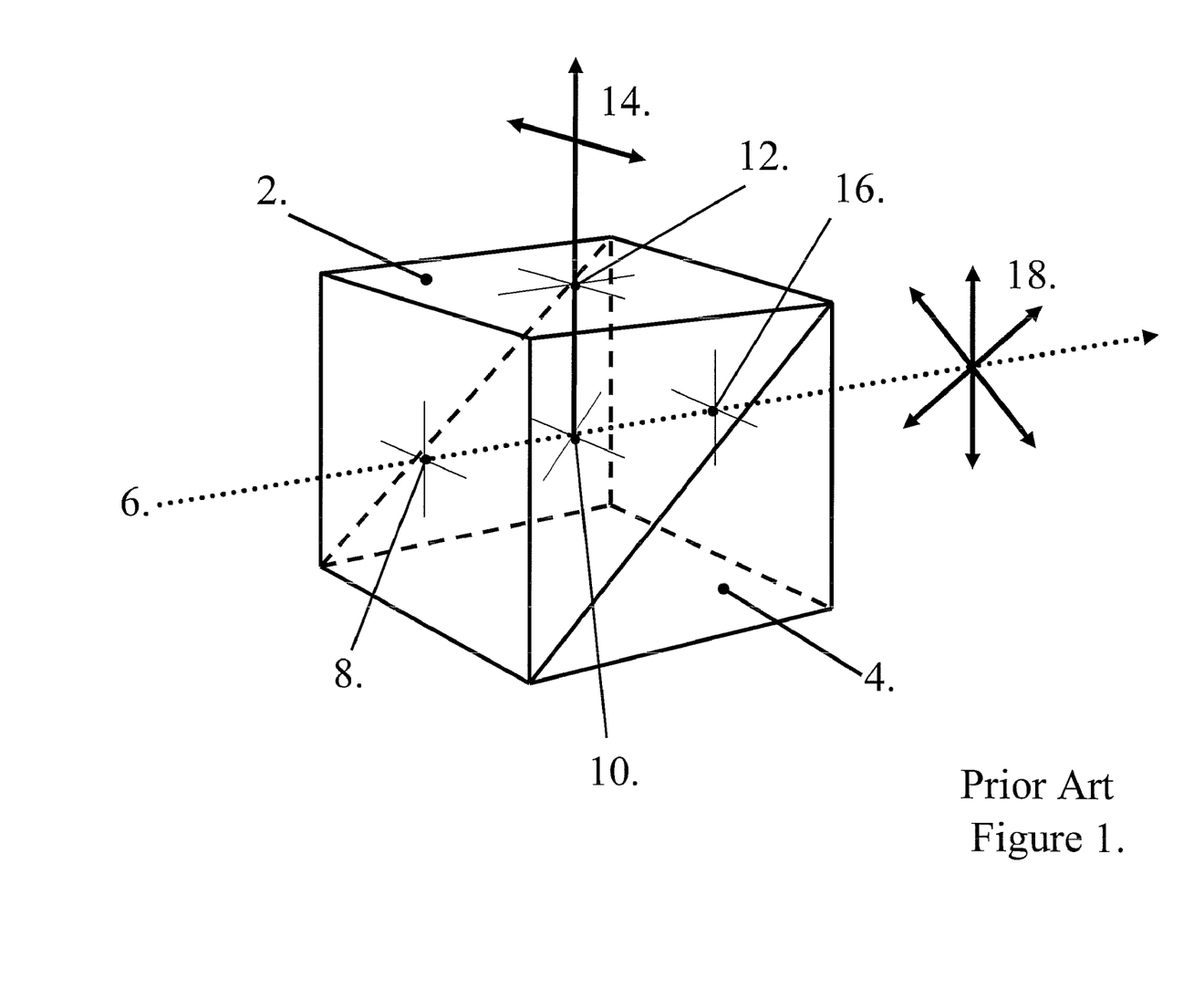
FIG. 1 labelled as PRIOR ART is a perspective view of a polarization beam splitter cube.

As a general principle, polarization beam splitters offer selective polarization isolation of only the reflected component of the stimulus. The transmitted portion is comprised of all remaining planes of polarization. FIG. 1 illustrates the characteristic features and operations of a typical polarization beam splitter cube. A beam of light (object 6), containing various planes of polarization, passes through the front face of the beam splitter (object 8), and strikes the interface (object 10) between the front (object 2) and rear (object 4) prism components of the beam splitter cube. The polarized component having a plane of orientation parallel to the interface (object 14) are reflected through the top face of the cube (object 12). All other planes of polarization (object 18) contained within the stimulus (object 6) exit through the rear face of the beam splitter cube (object 16). It is important to note that typical polarization beam splitters only effectively isolate one plane of polarization at the interface within the beam splitter cube. As such, they cannot be used in isolation to effectively isolate orthogonal planes of polarization within a common stimulus input for the purposes of creating a polarization difference image.

It is to be noted that while the prior art speaks to polarization difference imaging (PDI), the present application speaks to polarization difference sensing (PDS). The technology that will be hereinafter described can be used with a variety of forms of electro-magnetic radiation. For the purpose of this discussion, PDI is considered to be a subset of PDS, which results in the creation of visual images.

To truly isolate the orthogonally polarized components (relative to the initially isolated component), we have determined that a second polarization selective reflecting surface must be inserted along the optical axis. This polarization selectivity may be mediated by either the specific angle at which the light strikes the prism's interface (i.e. At Brewster's angle), or by the application of polarization selective coatings upon, or polarizing air gaps between the angled interface.

Figure 2:
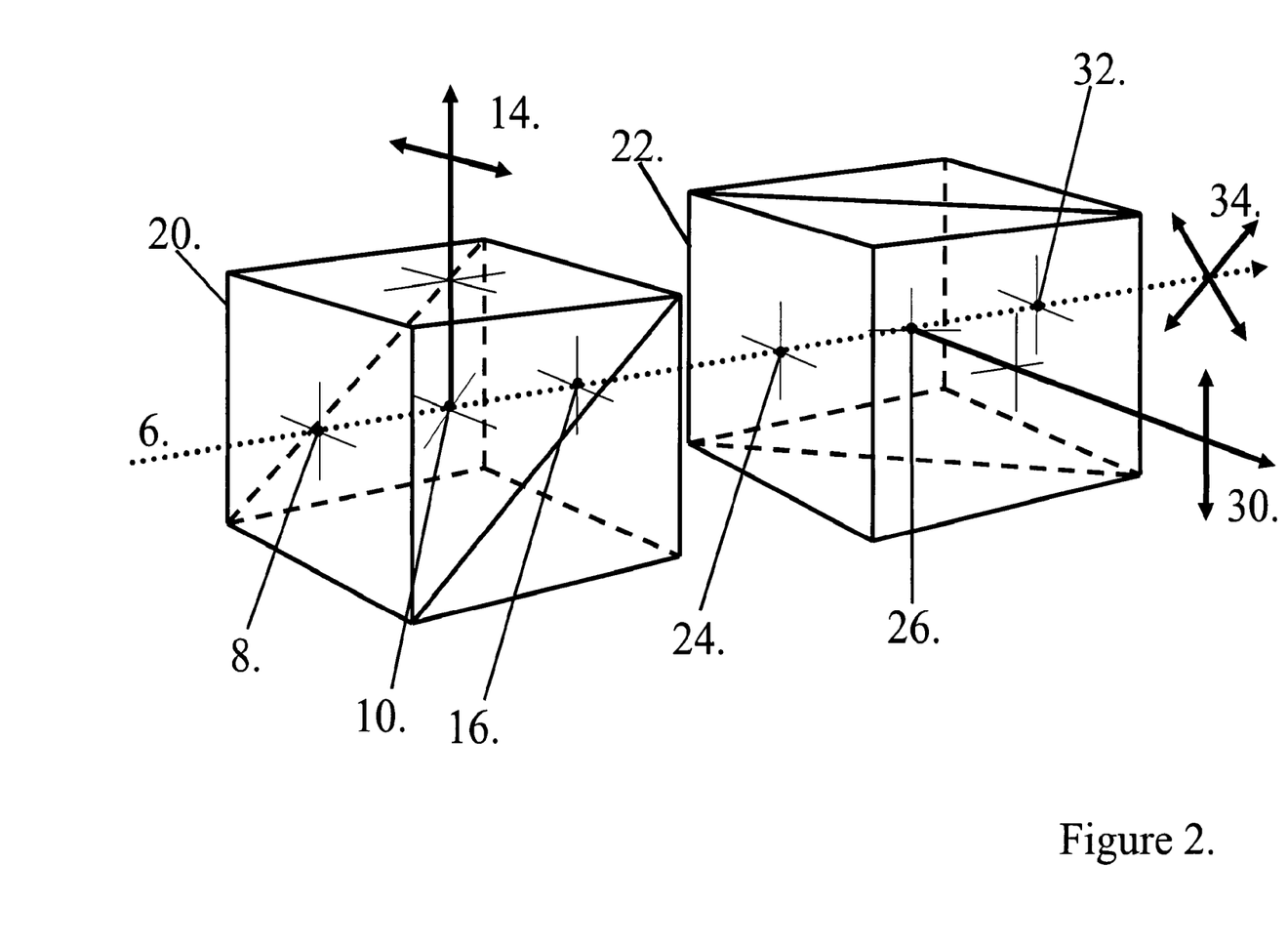
FIG. 2 is a perspective view of a tandem polarization beam splitter assembly having two cube bodies.

In its most basic embodiment, such a polarization beam splitter can be constructed by placing two standard polarization beam splitters (aligned in tandem along a common optical axis), with the second beam splitter rotated 90 degrees around the common optical axis (relative to the orientation of the first beam splitter). FIG. 2 illustrates the most basic arrangement of polarization beam splitter cubes which can be utilized to selectively isolate two orthogonal planes of polarization for the computation of a polarization difference image. As in FIG. 1, a polarization beam splitter (object 20) is used to effectively isolate one plane of polarization (object 14) from within a stimulus beam (object 6). The remaining planes of polarization exit the rear of the first polarization beam splitter cube (object 16), and passed through the front face (object 24) of the second axially aligned polarization beam splitter cube (object 22) which has been rotated 90° clockwise around the common optical axis. In this orientation, the reflecting interface (object 26) of the second polarization beam splitter cube (object 22) is oriented in such a way as to selectively isolate and reflect a plane of polarization (object 30) which is 90° orthogonal to the initially isolated polarization component (object 14). The remaining planes of polarization (object 34) exit the rear face (object 32) of the second polarization beam splitter either to be discarded or further processed, while the two isolated orthogonally polarized components are utilized for the computation of a polarization difference signal or image. While functional, this embodiment requires the careful alignment of two independent beam splitters, with potentially varied optical characteristics. A more robust solution is to construct the polarization beam splitter from a single central prism, having the two polarization selective faces cut orthogonal to each other relative to the common optical axis.

Figure 3:
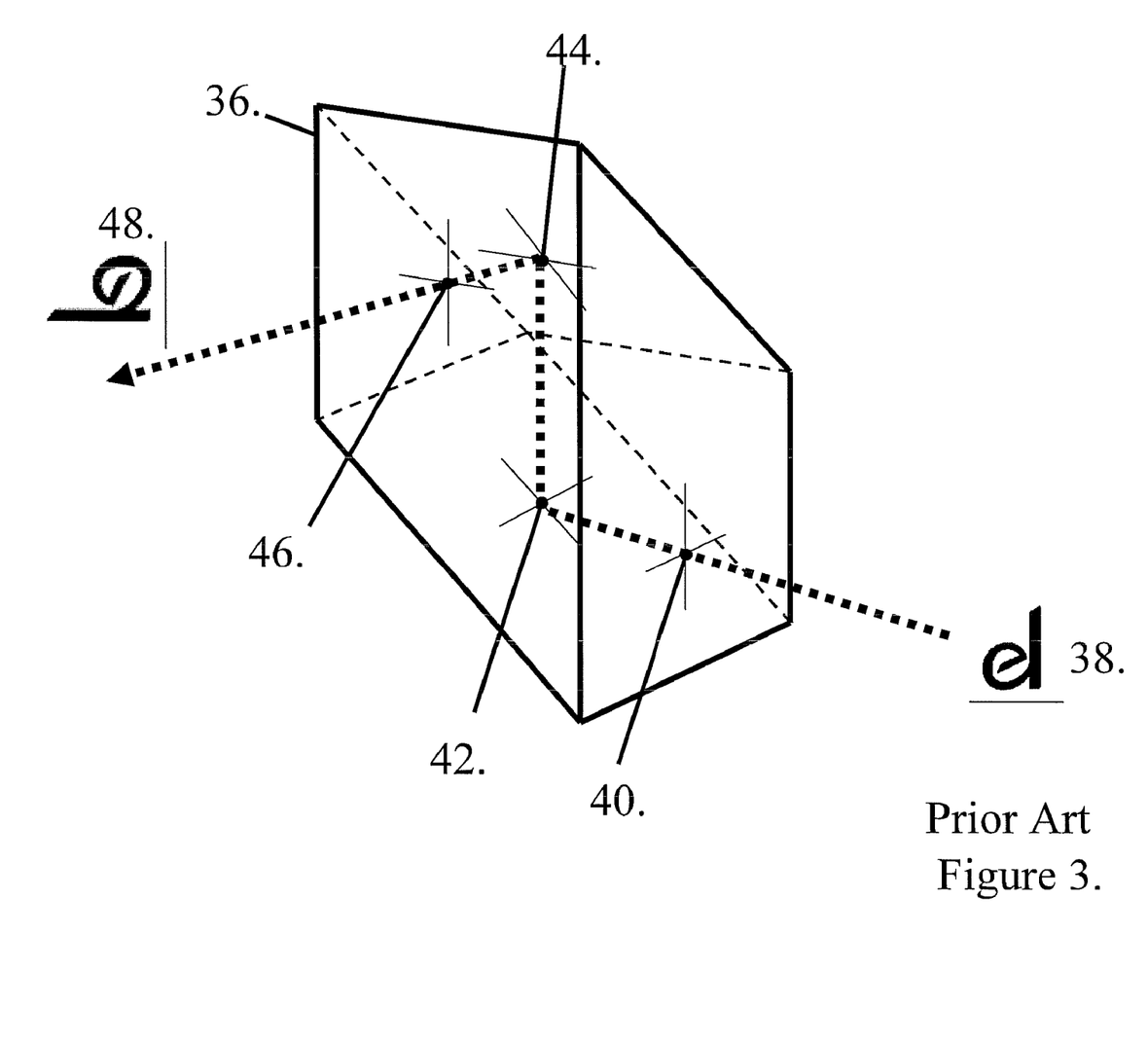
FIG. 3 labelled as PRIOR ART is a perspective view of a double 90 degree prism used for image rotation.

FIG. 3, labelled as Prior Art, illustrates the form and function of a double 90° prism (object 36). This form of prism is some times erroneously called a Porro-Abbe prism (which inverts an image while maintaining its handedness), however, it is clear from this illustration that an input image (object 38) undergoes only a 90° rotation (object 48), and inverts its handedness through a series of internal total reflections. After the image passes through the front of the prism (object 40), it strikes the first internal reflecting surface (object 42), where it is reflected 90° up to strike the second reflecting surface (object 44), before exiting through the side of the prism (object 46). If the exit beam (object 48) subsequently enters a second double 90° prism, the final image will be rotated 180° relative to the input image (object 38), and will re-gain its original handedness.

We have developed an optical component specifically optimized for polarization difference imaging (PDI). Our design efforts independently converged on a prism configuration (known as double 90-degree prism) which has previously been exclusively used for image inversion purposes. Our novel application of this geometric form results in the creation of a tandem dual polarization beam splitter offering unmatched optical isolation of the P and S polarized components of the stimulus input.

Figure 4:
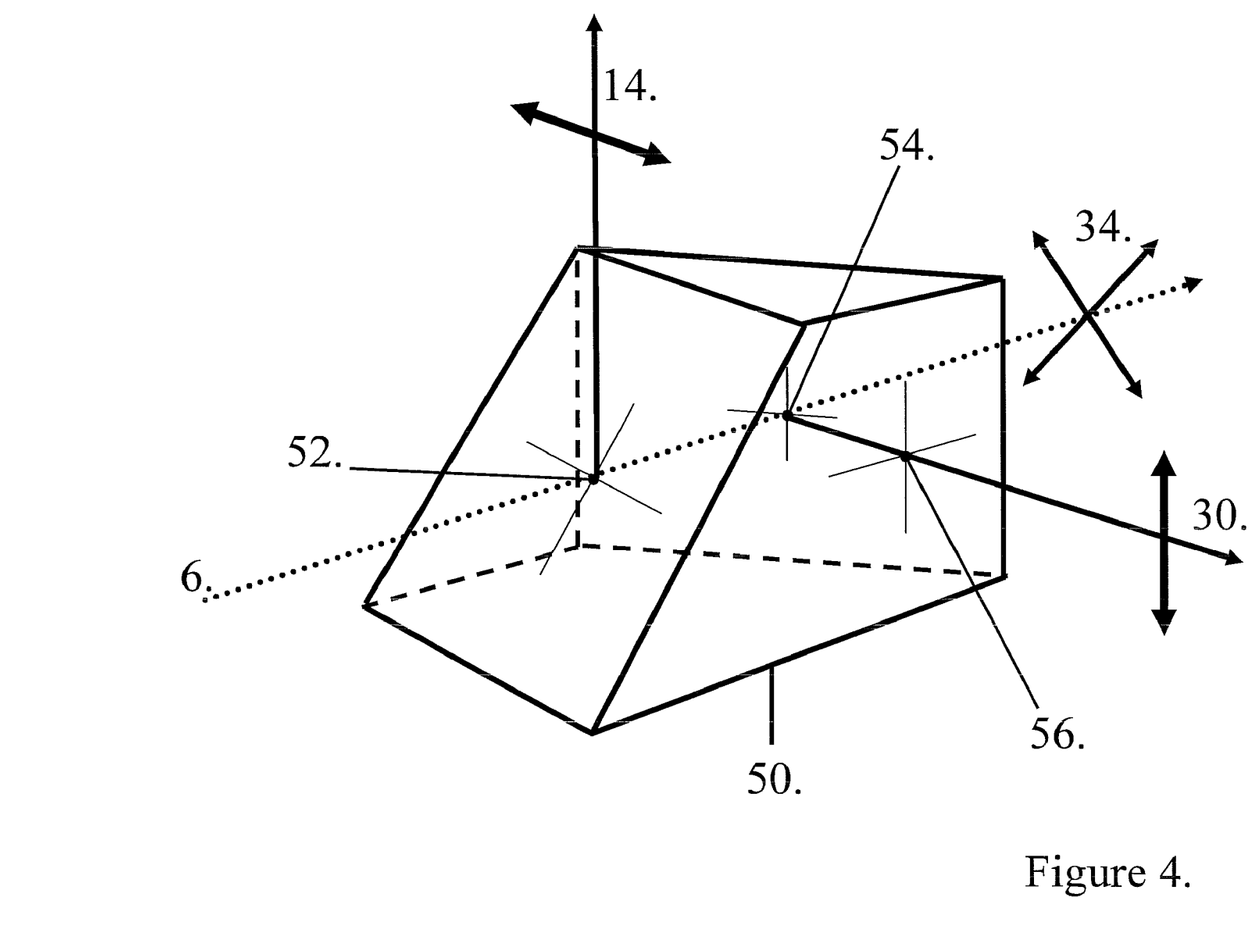
FIG. 4 is a perspective view of a core of a tandem polarization beam splitter made from a single cube body.

The combination of two double 90° prisms is known as a Porro-Abbe prism, which is used extensively for image rotation/lateral displacement in optical equipment such as binoculars and telescopes. FIG. 4 illustrates a novel application for a prism having a configuration the same as in FIG. 3. We independently converged on this form (object 50) while seeking to apply the principles underlying the polarization selectivity of two tandem polarizing beam splitters (as illustrated in FIG. 2), in a more simplified and physically robust optical design (note: two other components of this polarization beam splitter design have been omitted for clarity of this illustration). In this embodiment, an input beam (object 6) strikes the angled face (object 52), resulting in the reflection and isolation of the polarized component (object 14) which is parallel to the face of this surface. The remaining planes of polarization passed through the prism and strike the secondary angle the surface (object 54), resulting in the isolation and reflection of a second orthogonal plane of polarization (object 30) before exiting the prism (object 56) at right angles to the input beam. The planes of polarization (object 34) not isolated by the first (object 52) or second (object 54) reflecting surfaces exit the back of the prism.

Figure 5:
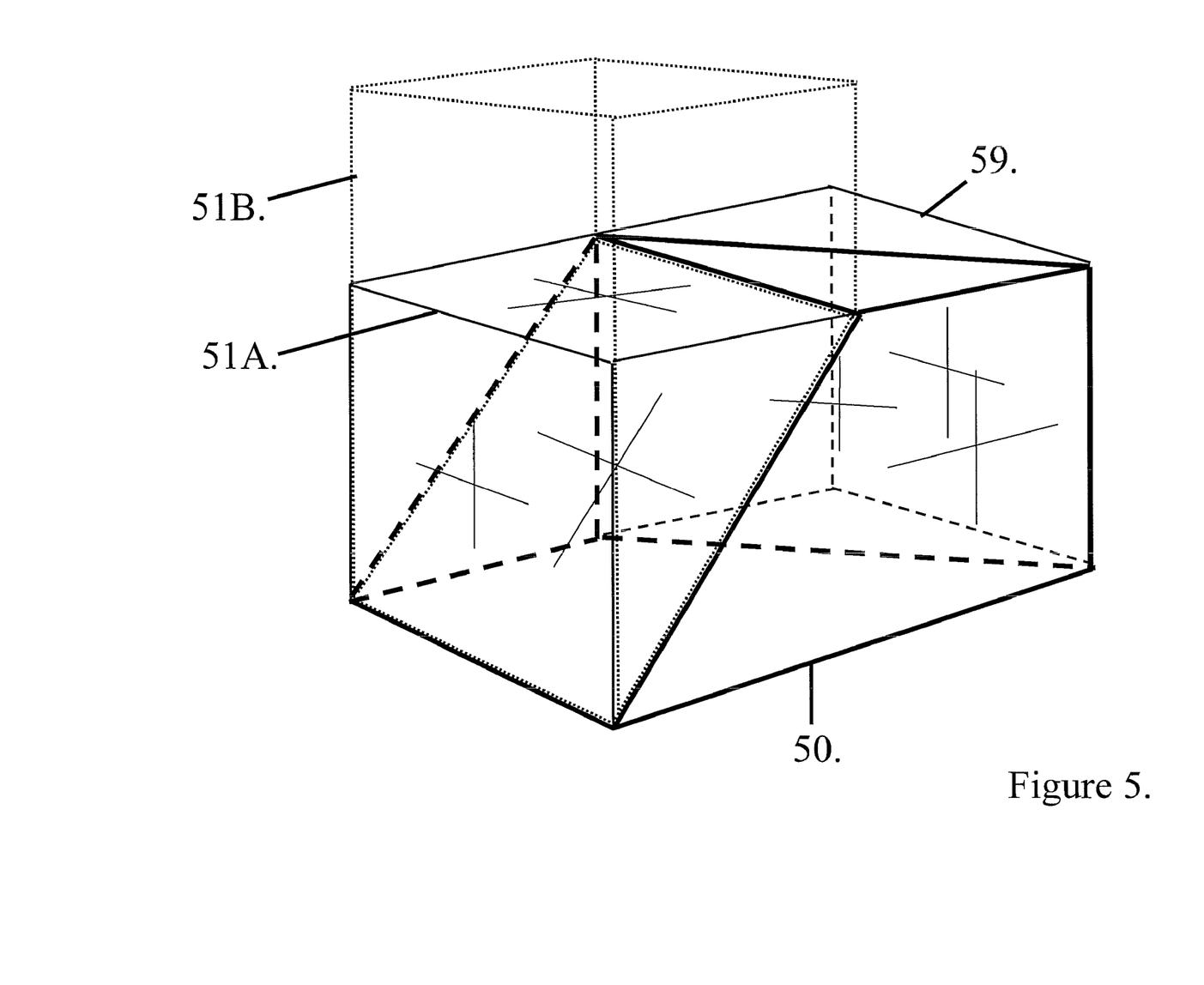
FIG. 5 is a perspective view of a complete tandem polarization beam splitter of FIG. 4, including a modification to make the stimulus path the same distance for each of the orthogonal planes of polarization.

It is clear that we do not deviate the direction of the imaging beam through total internal reflection (as is the fundamental application of the prism in FIG. 3), but rather utilize this geometric form for the novel application of isolating to orthogonal planes of polarization from a common stimulus input. FIG. 5 illustrates a fully assembled embodiment of this novel orthogonally selective dual polarization beam splitter design. The central core (object 50), as illustrated in FIG. 4, is capped by a front (object 51A) and rear (object 59) prism. The interfaces between these three components can be finished in a number of ways to maximize the isolation and separation of specific polarization components (such as applying Brewster's angle, polarization selective coatings, or polarization selective air gaps at the interfaces).

a. It should be noted that the optical path length through the prism is different for the two isolated planes of polarization. If this results in a phase difference which is detrimental to the imaging or sensing application being undertaken, the volume of the front prism (object 51A) may be extended along the axis of the first isolated polarized component to an extent which equals the extra volume of material transited by path length of the other isolated orthogonal plane of polarization (as defined by the light dotted line in FIG. 5 and identified by 51B).

Figure 6:
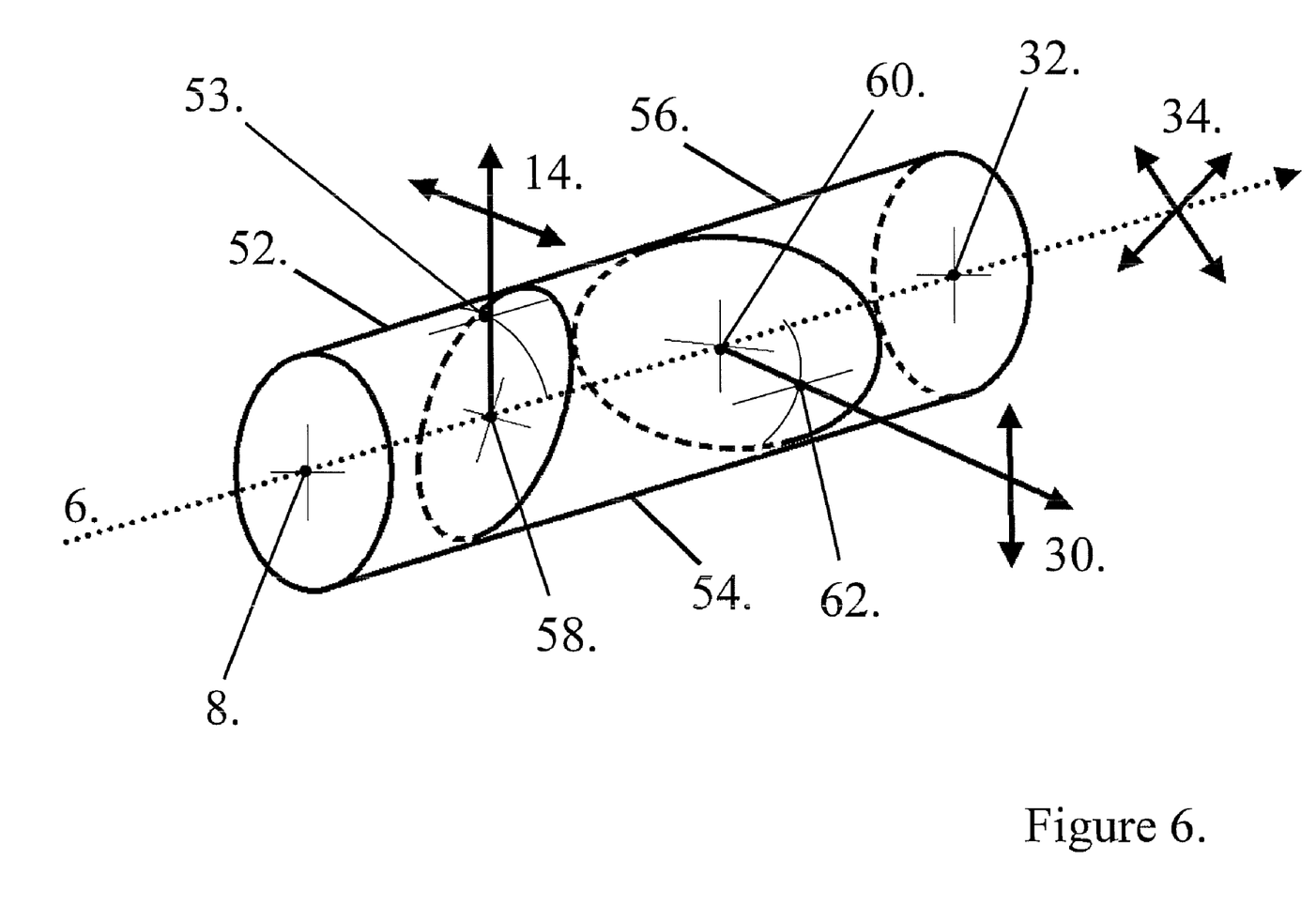
FIG. 6 is a perspective view of a tandem polarization beam splitter assembled to form a single cylindrical body.

A second possible embodiment of such a polarization beam splitter is to construct it from a cylindrical rod or fiber, segmented in such a way as to create the required orientation of polarization selective interfaces. FIG. 6 illustrates this embodiment of our tandem polarization beam splitter design utilizing an optical rod or fiber as the underlying form. In this case, a rod has been section into three components (objects 52, 54 and 56) with cuts creating interfaces (objects 58 and 60) having the same physical and functional relationship as the polarization selective surfaces outlined in FIG. 5. The input beam (object 6) passes through the perpendicular entrance face of the rod (object 8), and strikes the polarization selective angle surface (object 58) at the interface between object 52 and object 54. The plane of polarization which is parallel to the surface (object 14) exit through the sidewall of the rod (object 53). The remaining planes of polarization continue through the rod until striking the second angle surface (object 60), which reflects the second orthogonal plane of polarization (object 30) through the sidewall of the rod (object 62) at an angle 90° relative to the first reflected polarization beam component (object 14). Other planes of polarization (object 34) contained within the residual input beam exit the rear surface of the rod (object 32).

Figure 7A:
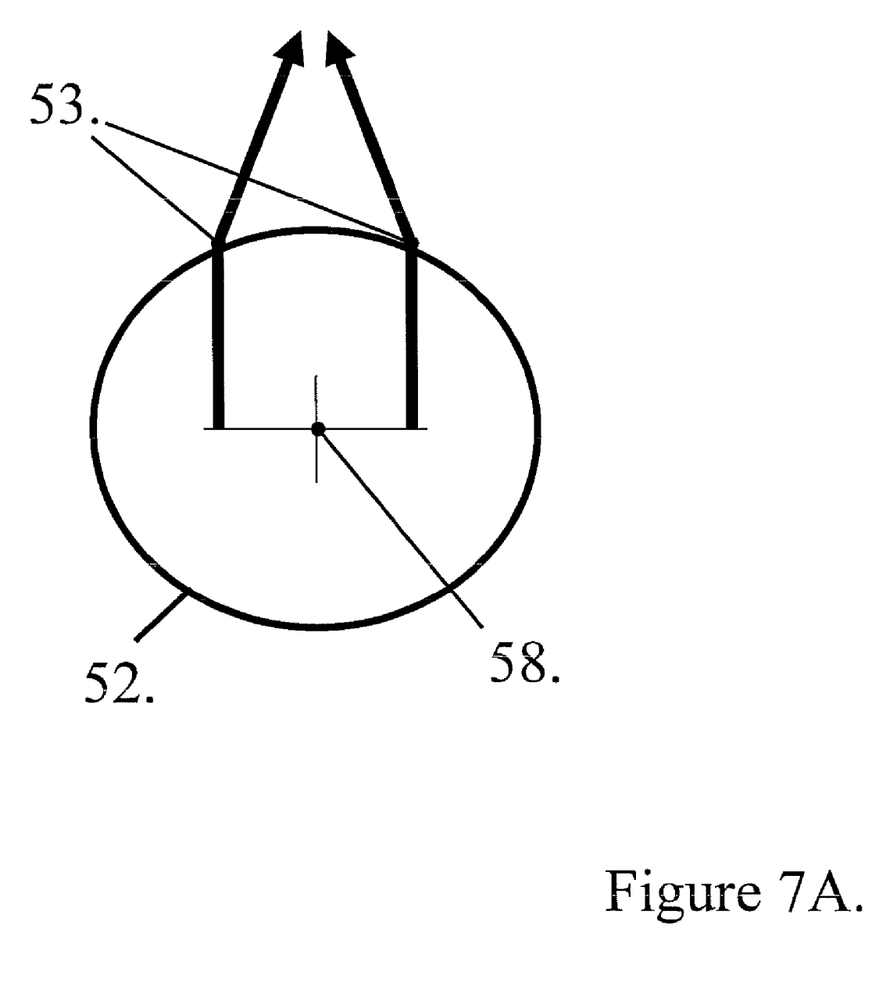
FIG. 7A is an end elevation view of the tandem polarization beam splitter of FIG. 6, showing how the cylindrical body acts to cause convergence of the reflected beams as they pass through the curved side walls of the cylindrical body.
Figure 7B:
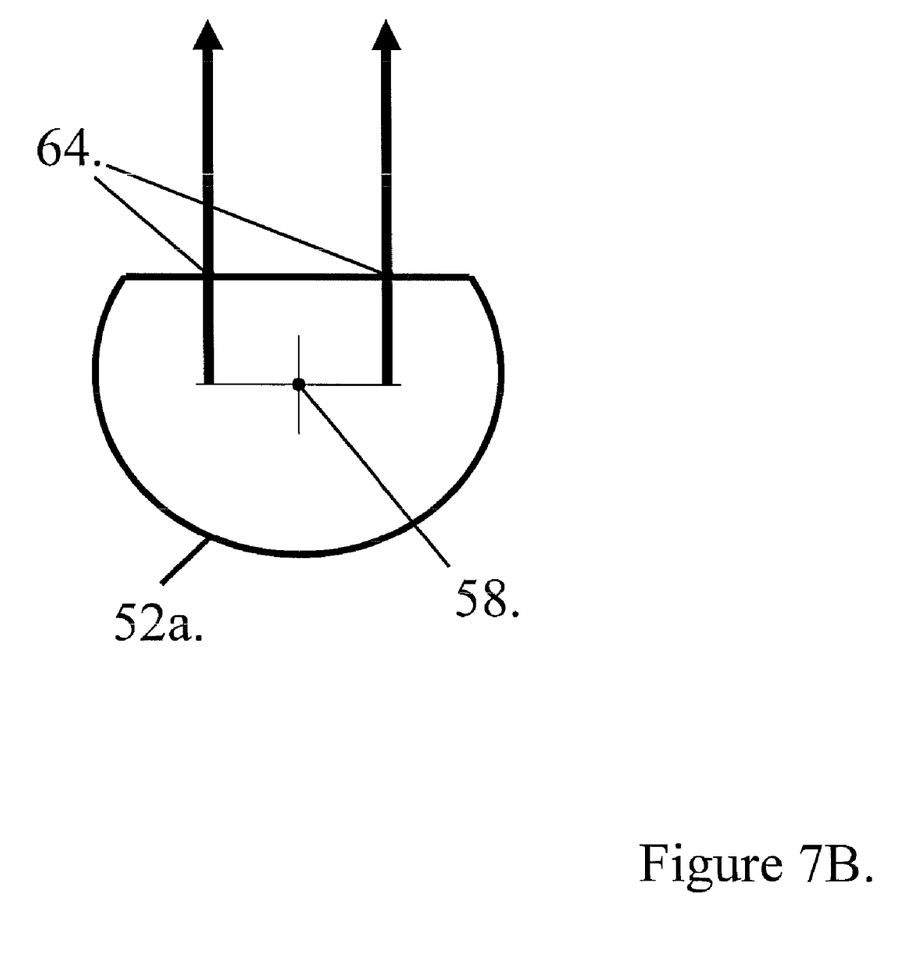
FIG. 7B is an end elevation view of the tandem polarization beam splitter of FIG. 6, which has been modified for imaging applications to avoid beam convergence.

A unique property of this embodiment is that the cylindrical form can also be utilized as a cylinder lens to focus the reflected polarized beams on to independent detectors (for non-imaging applications only). FIGS. 7A and 7B illustrates two cross sections (objects 52 and 52a respectively) through an optical rod or fiber, highlighting the functional consequences of the cylindrical form on the angle of the radially reflected polarized components as they exit the sidewall of the rod. In an intact rod (object 52), the cylindrical form acts as a lens causing the convergence of parallel beams as they exit through the curved wall (at points indicated by number 53). Since this convergence occurs only across one dimension of the imaging beam, this effect is not conducive in imaging applications. As a result of this limitation, we have modified the basic structural form of this rod-based dual polarization beam splitter to be optimized for imaging applications (see FIG. 7B, object 52a). Instead of a completely cylindrical form of cross-section, the surface of the rod where the reflected beams exit (denoted by number 64) has been cut perpendicular to the reflected light path, removing the lensing effects of the outer wall, and making this form applicable to imaging applications.

Figure 8:
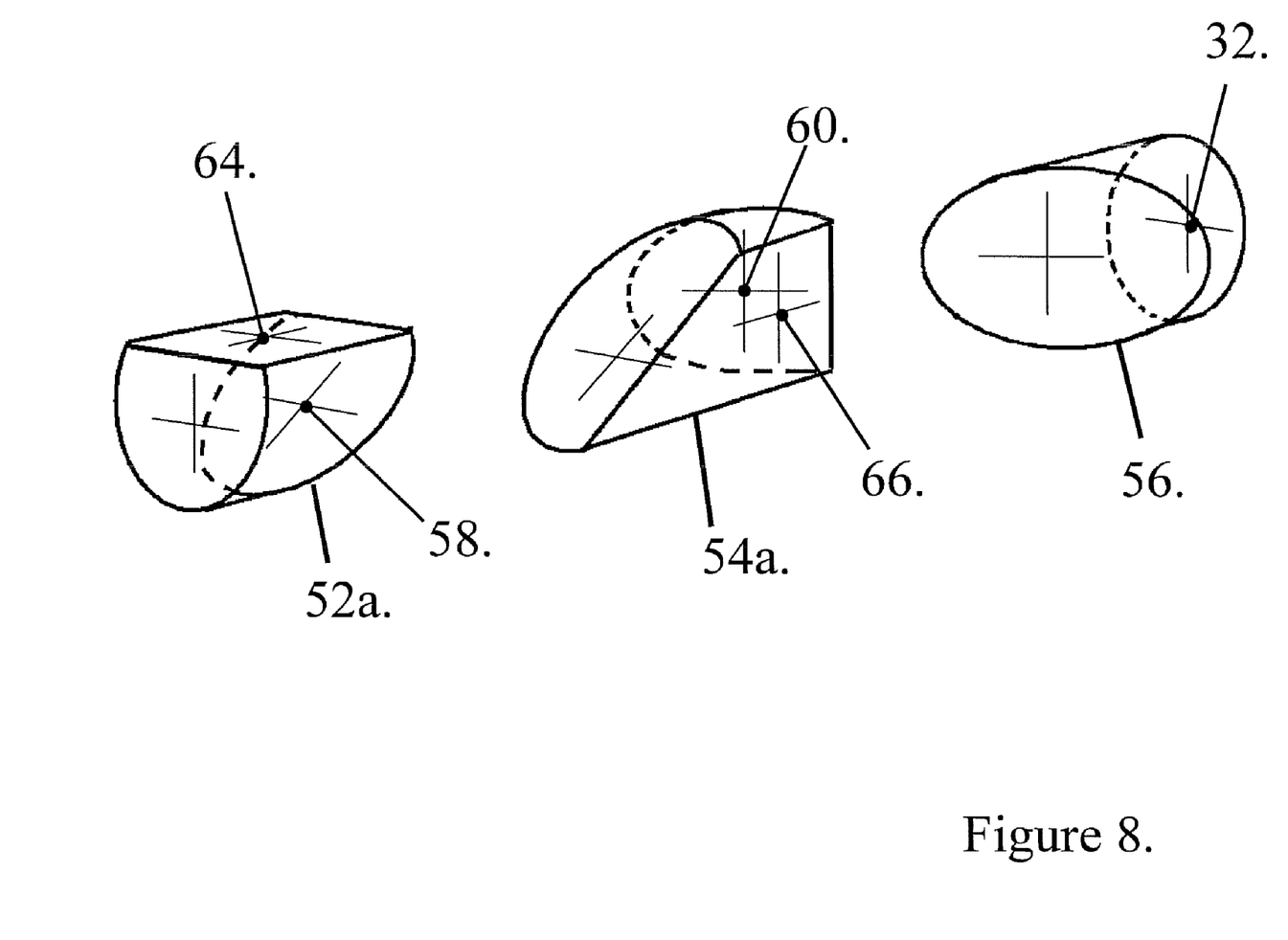
FIG. 8 is an exploded perspective view of a tandem polarization beam splitter made from multiple cylindrical bodies and modified for imaging applications.
Figure 9:
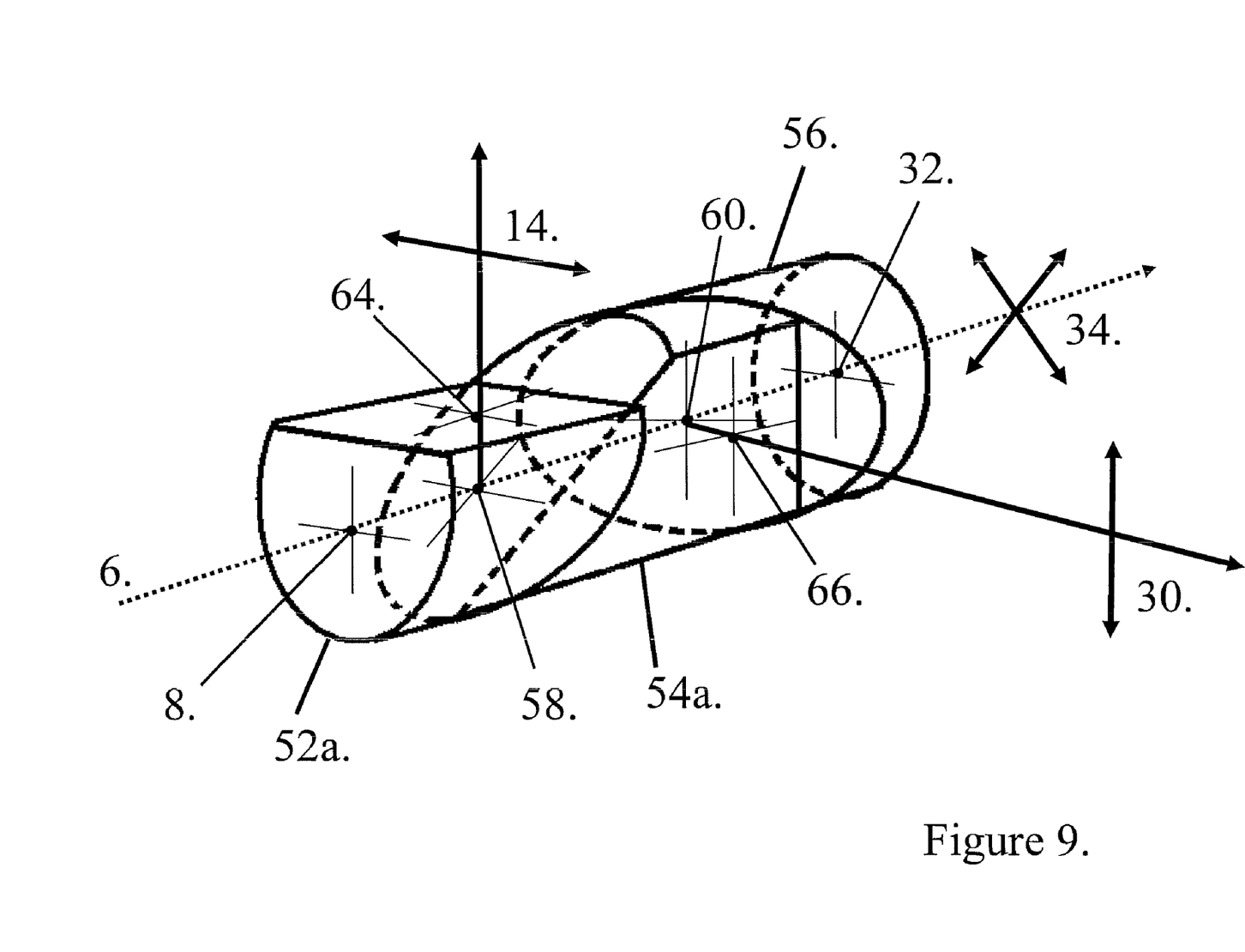
FIG. 9 is a perspective view of the assembled tandem polarization beam splitter of FIG. 8, illustrating the segregation of the signal pathways having orthogonal planes of linear polarization.

FIG. 8 illustrates the required modified cylindrical components to construct a dual polarization beam splitter for imaging applications. The first modified component (object 52a), isolates and reflects the first orthogonal plane of polarization from the angled interface (object 58) between itself and the second component (object 54a) radially through the perpendicular surface of the modified external wall (object 64). The remaining input beam continues through component 54a until selectively reflecting the second orthogonal polarization plane radially off the interface (object 60) between components 54a and 56, through the modified external wall which is perpendicular to the reflected beam (object 66). Since the remaining planes of polarization continue through and exit the last component (object 56), it requires no modifications for imaging applications and is identical to the component illustrated in FIG. 6. FIG. 9 illustrates how the components described in FIG. 8 can be assembled into a functional tandem dual polarization beam splitter. The input beam (object 6) enters through the perpendicular face (object 8) of component 52a, striking the polarization selective interface (object 58), and reflecting the isolated polarization component (object 14) radially through the perpendicular sidewall (object 64). The input beam continues through component 54a until striking the second polarization selective interface (object 60) and reflecting the orthogonally polarized component (object 30) radially through the perpendicularly oriented sidewall (object 66). The remaining planes of polarization within the input beam (object 34) continue and exit component 56 through the rear perpendicular wall (object 32).

The embodiment of the cylindrical tandem dual polarization beam splitter is particularly well suited for applications requiring a miniaturization of the optics (for example a real-time polarization difference imaging based orthoscope). In such an application, right angle prisms can be affixed to components 52a and 54a in such a way as to fold the radially directed orthogonal beams of polarization parallel to the original optical axis (for example, see FIG. 10, object 68). Coupling optics can then be used to transmit the polarization selective images through coherent optical fiber bundles (or image guides) where their output can be coupled to CCD or other imaging technology. The output of these imagers can then be processed to create a real-time polarization difference image, which would significantly enhance the imaging qualities of such a system.

Figure 10:
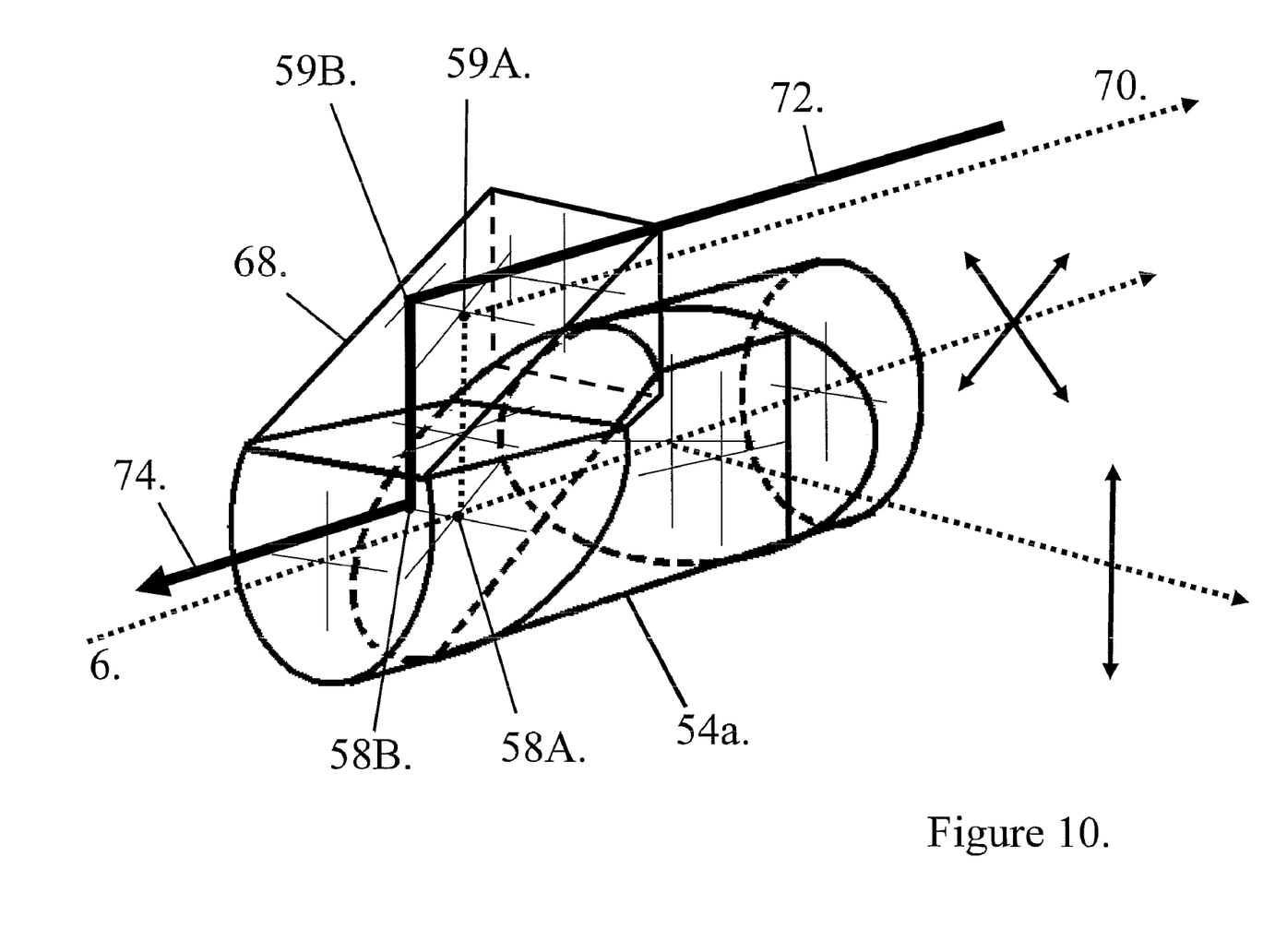
FIG. 10 is a perspective view of the assembled tandem polarization beam splitter of FIG. 8, with a secondary or return signal being sent back along a signal path isolating the first plane of polarization.

Referring to FIG. 10, the embodiment of FIG. 9 is shown as having a prism 68 for directing a signal path 70 to be parallel to the initial optical axis. There is also illustrated how a secondary or return signal, such as laser illumination, can be sent back along signal path 70 parallel to that followed by the first plane of information. The return signal, such as that generated by a laser beam enters along path 72 and exits back toward the source of the common stimulus along path 74.

When used for PDS sensing, a variety of forms of electro-magnetic radiation can be used. Visible light, Infrared (IR), and Ultraviolet (UV) are suitable for PDI applications. Infrared (IR) is suitable for telecommunications applications or for medical applications in which examination is conducted through a patient's skin. Ultraviolet (UV) is suitable for the microscopic examination of surface textures or for UV lithography.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of real-time polarization difference sensing, the method comprising the steps of:
    directing a common stimulus input containing multiple differing planes of linear polarization along a linear input signal path;
    placing two faces that isolate two orthogonal planes of information from the common stimulus input in series along the linear input signal path, with a first of the two faces reflecting a first plane of information having a first linear polarization of the common stimulus input with a transmission portion of the common stimulus input passing through the first of the two faces and through either an air gap or a prism medium directly onto a second of the faces, so as to maintain isolation and separation of polarization components, the second of the two faces reflecting a second plane of information having a second linear polarization which is orthogonal to the first plane of information, with the transmission portion of the common stimulus input passing through the second of the two faces;
    capturing information from the first plane of information with a first sensor for a useful purpose; and
    capturing information from the second plane of information with a second sensor for a useful purpose
    determining a real-time polarization difference by subtracting one of the first plane of information or the second plane of information from the other.

2. The method of claim 1, further comprising the step of passing a remainder of the common stimulus input along a linear input signal path.

3. The method of claim 2, further including a step of reflecting a return signal off the first of the two faces and back parallel to the signal path of the common stimulus input.

4. The method of claim 1, further comprising the step of using an electro-magnetic radiation as the common stimulus input, and the information captured from the first plane of information and the second plane of information being utilized to form images from electro-magnetic radiation passing from external objects along the linear signal path to the first of the two faces.

5. The method of claim 4, further comprising the step of selecting the common stimulus input from one of a visible portion, an infrared portion or an ultraviolet portion of the electro-magnetic radiation.

6. The method of claim 4, further comprising the steps of forming the first of the two faces on a first beam splitter cube and forming the second of the two faces on a second beam splitter cube.

* * * * *